US008909648B2

(12) United States Patent
El-Yaniv et al.

(10) Patent No.: US 8,909,648 B2
(45) Date of Patent: Dec. 9, 2014

(54) METHODS AND SYSTEMS OF SUPERVISED LEARNING OF SEMANTIC RELATEDNESS

(75) Inventors: Ran El-Yaniv, Haifa (IL); David Yanay, Kiryat-Bialik (IL)

(73) Assignee: Technion Research & Development Foundation Limited, Haifa (IL)

( * ) Notice: Subject to any disclaimer, the term of this patent is extended or adjusted under 35 U.S.C. 154(b) by 0 days.

(21) Appl. No.: 13/352,374

(22) Filed: Jan. 18, 2012

(65) Prior Publication Data
US 2013/0185307 A1    Jul. 18, 2013

(51) Int. Cl.
*G06F 17/30* (2006.01)

(52) U.S. Cl.
USPC .......................................... 707/739; 707/748

(58) Field of Classification Search
CPC ............ G06F 17/2785; G06F 17/2795; G06F 17/3061; G06F 17/30684; G06F 17/30734; G06F 17/2775; G06F 17/30; G06F 17/30598
USPC ......... 707/723, 726, 727, 730, 737, 739, 740, 707/748, 749, 763, 771, 780, 732, 770; 704/4, 9, 10; 715/256, 259, 260; 706/55
See application file for complete search history.

(56) References Cited

U.S. PATENT DOCUMENTS

| | | | | |
|---|---|---|---|---|
| 2007/0106493 | A1* | 5/2007 | Sanfilippo et al. | 704/9 |
| 2008/0229251 | A1* | 9/2008 | Davies et al. | 715/854 |
| 2011/0270883 | A1* | 11/2011 | Bukai et al. | 707/777 |
| 2011/0302153 | A1* | 12/2011 | Meretakis et al. | 707/722 |
| 2012/0079372 | A1* | 3/2012 | Kandekar et al. | 715/256 |

OTHER PUBLICATIONS

Xie et al. Keyword Extraction Based on Semantic Relatedness, Cognitive Informatics (ICCI), 2010 9th IEEE International Conference on, Digital Object Identifier: 10.1109/COGINF.2010.5599721, Publication Year: 2010, pp. 308-312.*
Agirre et al. "A Study on Similarity and Relatedness Using Distributional and WordNet-Based Approaches", Proceedings of NAACL '09 Human Language Technologies: The 2009 Annual Conference of the North American Chapter of the Association for Computational Linguistics, p. 19-27, 2009.
Finkelstein et al. "Placing Search in Context: The Concept Revisited", 10th Internation World Wide Web Conference, WWW10, Hong Kong, China, May 1-5, 2001, p. 406-414, 2001.

* cited by examiner

*Primary Examiner* — Greta Robinson (57) ABSTRACT

A method of evaluating a semantic relatedness of terms. The method comprises providing a plurality of text segments, calculating, using a processor, a plurality of weights each for another of the plurality of text segments, calculating a prevalence of a co-appearance of each of a plurality of pairs of terms in the plurality of text segments, and evaluating a semantic relatedness between members of each the pair according to a combination of a respective the prevalence and a weight of each of the plurality of text segments wherein a co-appearance of the pair occurs.

25 Claims, 4 Drawing Sheets

| # | play | | player | | record | | club | |
|---|------|---|--------|---|--------|---|------|---|
|   | Music | Sports | Music | Sports | Music | Sports | Music | Sports |
| 1 | band | game | instrument | play | release | set | dance | football |
| 2 | guitar | team | play | league | album | season | night | league |
| 3 | instrument | season | replace | game | label | win | heart | cup |
| 4 | perform | player | join | season | band | career | fan | play |
| 5 | time | football | guitar | born | song | finish | local | divis |
| 6 | year | first | technique | team | first | run | house | season |
| 7 | role | score | key | football | new | game | London | manage |
| 8 | tour | club | example | professional | studio | won | scene | success |
| 9 | two | year | football | baseball | production | score | mix | found |
| 10 | new | career | hand | major | sign | second | radio | player |

METHODS AND SYSTEMS OF SUPERVISED LEARNING OF SEMANTIC RELATEDNESS

FIELD AND BACKGROUND OF THE INVENTION

The present invention, in some embodiments thereof, relates to semantic analysis and, more particularly, but not exclusively, to methods and systems of supervised learning of semantic relatedness.

In recent years, the problem of automatically determining semantic relatedness has been steadily gaining attention among statistical natural language processing (NLP) and artificial intelligence (AI) researchers. As used herein, semantic relatedness (SR) means semantic similarity, semantic distance, semantic relatedness, and/or a quantification of a relation between terms. This surge in semantic relatedness research has been reinforced by the emergence of applications that can greatly benefit from semantic relatedness capabilities, such as targeted advertising, content aggregation, content presentation, information retrieval, and web search, automatic tagging and linking, and text categorization.

With few exceptions, most of the algorithms proposed for SR valuation have been following an unsupervised learning and/or knowledge engineering procedures whereby semantic information is extracted from a (structured) background knowledge corpus using predefined formulas or procedures.

An example of a supervised SR learning is described in E. Agirre, E. Alfonseca, K. Hall, J. Kravalova, M. Pasca, and A. Soroa. A study on similarity and relatedness using distributional and wordnet-based approaches. In NAACL, pages 19-27, Morristown, N.J., USA, 2009. Association for Computational Linguistics, which is incorporated herein by reference. This publication teaches a classification which is based on determining which pair among two pairs of terms includes terms which are more related to each other. Each instance, consisting of two pairs {t1; t2} and {t3; t4}, is represented as a feature vector constructed using SR scores and ranks from unsupervised SR methods. Using support vector machine (SVM) this approached achieved 0.78 correlation with Word-Similarity-353 Test Collection, see Lev Finkelstein, Evgeniy Gabrilovich, Yossi Matias, Ehud Rivlin, Zach Solan, Gadi Wolfman, and Eytan Ruppin, "Placing Search in Context: The Concept Revisited", *ACM Transactions on Information Systems*, 20(1):116-131, January 2002, which is incorporated herein by reference. The structure-free background knowledge used for achieving this result consisted of four billion web documents.

SUMMARY OF THE INVENTION

According to some embodiments of the present invention, there are provided computerized methods of evaluating semantic relatedness of terms. The method comprises providing a plurality of text segments, calculating, using a processor, a plurality of weights each for another of the plurality of text segments, calculating a prevalence of a co-appearance of each of a plurality of pairs of terms in the plurality of text segments, and evaluating a semantic relatedness between members of each pair according to a combination of a respective the prevalence and a weight of each of the plurality of text segments wherein a co-appearance of the pair occurs.

Optionally, the method further comprises generating a semantic relatedness dataset mapping the semantic relatedness between members of each pair.

Optionally, the method further comprises using the semantic relatedness for minimizing an error in the plurality of weights.

Optionally, the method further comprises using the semantic relatedness for maximizing a reward in the plurality of weights.

Optionally, each text segment is a member of a group consisting of a sentence, a paragraph, a set of paragraphs, an email, an article, a webpage, an instant messaging (IM) content, a post in a social network, a twit, a website, and a file containing text.

Optionally, the plurality of text segments associated with at least one user; wherein the semantic relatedness is subjective to the at least one targeted user.

More optionally, the plurality of text segments associated with at least one field of interest; wherein the semantic relatedness is subjective to the at least one targeted user.

More optionally, the plurality of text segments are extracted from a plurality of webpages visited by the at least one targeted user.

More optionally, the plurality of text segments are authored by the at least one targeted user.

More optionally, the calculating comprises monitoring a plurality of network documents associated with the at least one user and calculating the plurality of weights accordingly.

More optionally, the plurality of text segments are extracted from a plurality of documents stored in storage allocated to the at least one targeted user.

More optionally, the evaluating comprises determining at least one characteristic of the at least one user according to an analysis of the semantic relatedness dataset.

More optionally, the plurality of text segments comprises a member of a group consisting of: an email send by the user, an email send to the user, a webpage viewed by the user, a document retrieved in response to a search query submitted by the user, a file stored on a client terminal associated with the user, and a file stored in a storage location associated with the user.

More optionally, the storage is a member of a group consisting of: a client terminal, a virtual storage location, an email server, a web server, and a search engine record.

Optionally, the method further comprises classifying at least some members of each pair according to the semantic relatedness.

Optionally, the calculating a plurality of weights comprises calculating the plurality of weights according to input provided by the user for at least some of the plurality of text segments.

Optionally, the calculating a plurality of weights comprises calculating the plurality of weights according a match with a search history of the user.

Optionally, the calculating a plurality of weights comprises calculating each of the plurality of weights according to an origin of a respective the text segment.

Optionally, the calculating a plurality of weights is calculated according to an active learning algorithm which analyzes the plurality of text segments.

According to some embodiments of the present invention, there are provided a computerized method of evaluating a semantic relatedness of terms. The method comprises identifying a plurality of text segments associated with at least one targeted user, calculating, using a processor, a plurality of weights each to another of the plurality of text segments, and calculating a prevalence of a co-appearance of each of a plurality of pairs of a plurality of terms in the plurality of text segments, evaluating a semantic relatedness between members of each pair according to the prevalence, and using the semantic relatedness in conjunction with inputs of the at least one user for at least one of aggregating personalized content, searching for content, and providing services to the at least one user.

According to some embodiments of the present invention, there are provided a system of evaluating a semantic relatedness of terms. The system comprises a processor, an input interface which receives a plurality of text segments, a weighting module calculating a plurality of weights each for another of the plurality of text segments, and a dataset generation module which calculates, using the processor, a prevalence of a co-appearance of each of a plurality of pairs of terms in the plurality of text segments, evaluates a semantic relatedness between members of each pair according to a combination of a respective the prevalence and a weight of each of the plurality of text segments wherein a co-appearance of the pair occurs, and generates a semantic relatedness dataset mapping the semantic relatedness between members of each pair.

According to some embodiments of the present invention, there are provided a method of evaluating semantic relatedness of terms which comprises presenting a user with a plurality of pairs of terms, receiving from the user a plurality of semantic relatedness evaluations each indicative of semantic relatedness between members of another of the plurality of pairs, calculating, using a processor, a plurality of weights for the plurality of pairs each weight being calculated according to a respective group of the plurality of semantic relatedness evaluations, calculating a prevalence of a co-appearance of each of the plurality of pairs of terms in a plurality of text segments, and evaluating a new semantic relatedness between members of each pair according to a combination of a respective the prevalence and respective the weight.

Optionally, the presenting comprises presenting the user with two of the plurality of pairs of terms in each of a plurality of iterations and receiving from the user, in each iteration, one of the plurality of semantic relatedness evaluation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile and non-transitory storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to semantic analysis and, more particularly, but not exclusively, to methods and systems of supervised learning of semantic relatedness.

According to some embodiments of the present invention, there are provided methods and systems for evaluating semantic relatedness of terms by calculating a prevalence of a co-appearance of each of a plurality of pairs from a group of terms in a plurality of text segments, such as documents, webpages, emails, and/or the like which are related to the one or more targeted users and/or identified as related to a common field of interest. In such a manner, user specific semantic relatedness dataset that maps the strength of semantic relatedness between terms may be generated.

The text segments are optionally provided as a corpus that is extracted from a storage associated with the targeted user(s) and/or selected by them.

According to some embodiments of the present invention, there are provided methods and systems for evaluating semantic relatedness of terms by calculating a prevalence of a co-appearance of each of a plurality of pairs of terms in a plurality of text segments which are weighted according to their relevancy to the targeted user(s). For example, the weights are set manually and/or automatically according to an analysis of their content and/or origin. In such a manner, user specific semantic relatedness dataset that maps the strength of semantic relatedness between terms may be generated using any corpus of text segments. The weights optionally characterize intellectual interests and (general) knowledge of the targeted user(s). The weights of certain text segments are optionally improved in passive or active learning processes, for example according to the elevation of semantic relatedness of terms which are found in the certain text segments.

The semantic relatedness, which is optionally user specific, may be used for facilitating a personalized search and/or a field adapted search, personalized advertising, personalized content aggregation, personalized filtering, and/or the like. The semantic relatedness may be stored in a dataset, such as a model, that is dynamically improved in a learning process according to inputs from the targeted users, for example new text segments, such as webpages which are accessed and/or content that is authored and/or according to weights, which are set according to user inputs.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
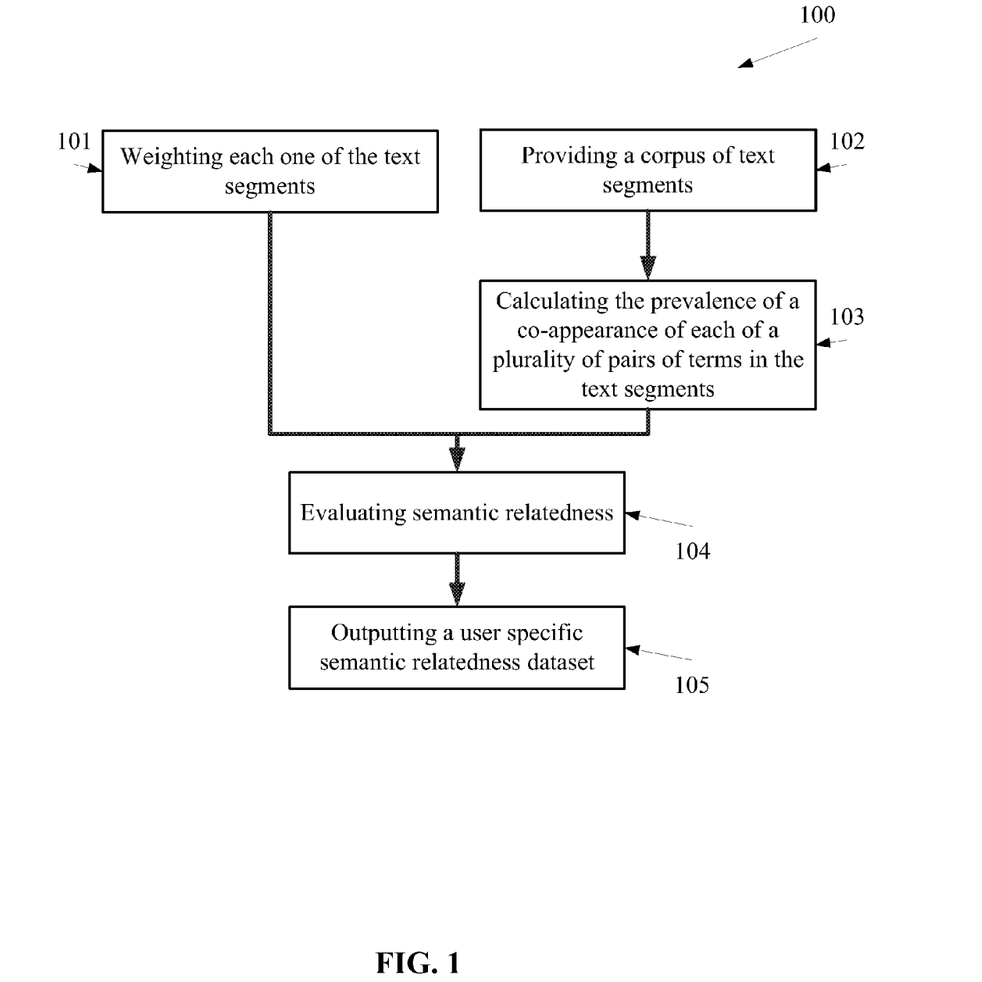
FIG. 1 is a flowchart of a method of evaluating user(s) specific semantic relatedness of terms according to an analysis of co-appearance of pairs of terms in a plurality of text segments, according to some embodiments of the present invention.

Reference is now made to FIG. 1, which is a flowchart 100 of a method of evaluating user(s) specific semantic relatedness of terms by an analysis of a prevalence of a co-appearance of pairs of terms in a plurality of text segments, optionally weighted, from a corpus of text segments, optionally personalized, according to some embodiments of the present invention. As used herein, a text segment means any text section, such as a sentence, a paragraph, a set of paragraphs, an email, an article, a webpage, an instant messaging (IM) content, a post in a social network, a tweet (from www.twitter.com), a website, a file containing text, and/or the like. The method is optionally used for generating a user(s) specific semantic relatedness dataset that subjectively maps semantic relations according to data pertaining to a targeted user and/or a group of users having one or more common characteristics and/or social connections(s). For brevity, a user and/or a group of users may be referred to herein interchangeably.

In such embodiments, the text segments may be weighted manually and/or automatically according to the activity of the user(s) and/or the selections of the user(s). Additionally or alternatively, the analyzed text segments may be selected according to the activity of the user(s), the selections of the user(s), and/or the content which is created, reviewed, and/or accessed by the user(s).

Figure 2:
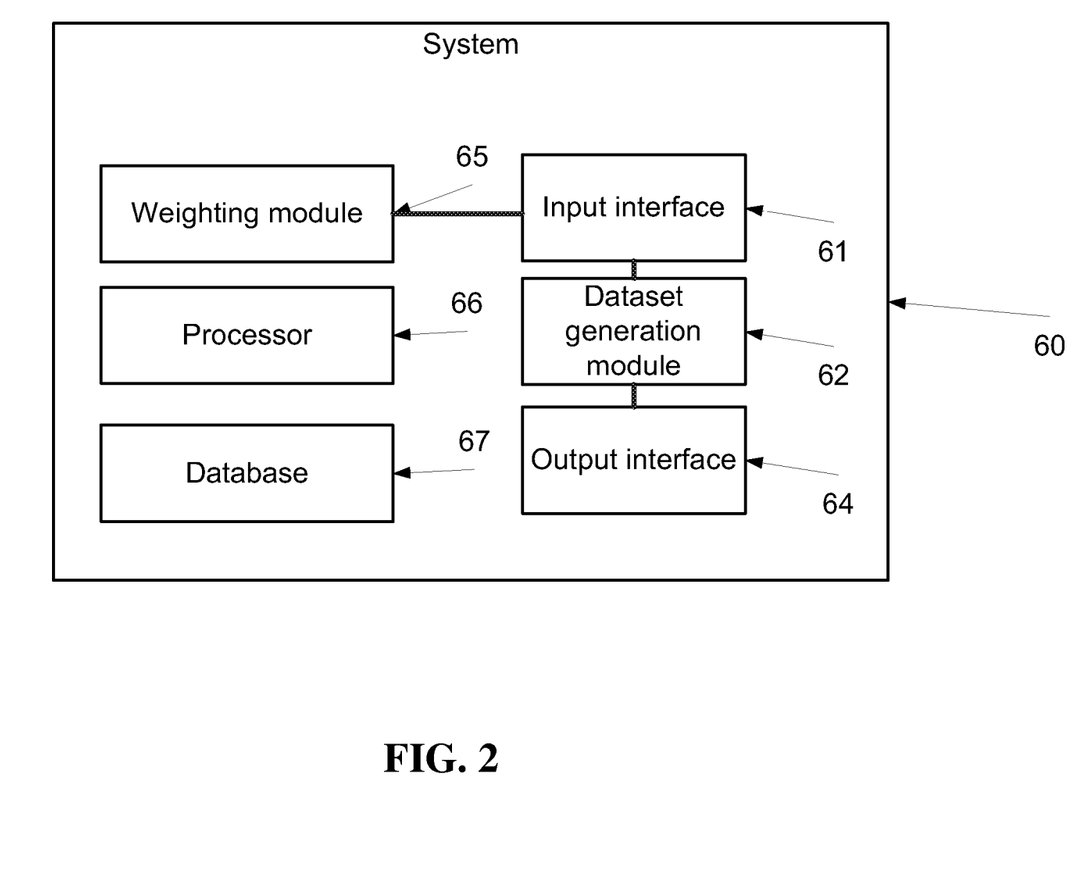
FIG. 2 is a is a relational view of software components of a system for a user(s) specific semantic relatedness dataset according to an analysis of co-appearance of pairs of terms in a plurality of text segments, according to some embodiments of the present invention.

Reference is also made to FIG. 2 which illustrates a relational view of software components of a system 60, centralized or distributed, having a processor 66 for evaluating user(s) specific semantic relatedness of terms according to an analysis of co-appearance of pairs of terms in a plurality of text segments, according to some embodiments of the present invention. The system 60 may be implemented on any or using any of various computing units, such as a desktop, a laptop, a network node, such as a server, a tablet, and/or the like. As shown, software components include an input interface 61 that receives the text segments and optionally the respective weights (i.e. real numbers) from one or more weighting modules 65 which are hosted in client module(s) and monitor one or more targeted users. The text segments and/or references thereto and optionally the respective weights are stored in a database 67. The system 60 further includes a dataset generation module 62 for evaluating user(s) specific semantic relations, for example as described below. The system 60 further includes, an output interface 64 for outputting the semantic relation dataset, which is optionally user specific, for example as described below. The output may be to a presentation unit which presents the dataset, for example either graphically or textually, to a user on a display of which is connected to the system and/or to module, such as a targeted advertising module, a classifier, and/or a content aggregator which uses the dataset for generating content for the targeted user and/or for classification thereof. The lines in FIG. 2 depict optional and non limiting data flow between the modules. The data may flow directly or via one or more computer networks.

First, as shown at 101 a corpus of a plurality of text segments is provided, for example received at the input interface 61. The corpus may be any background knowledge (BK) corpus. For example, one or more databases of text segments are designated as a corpus. For brevity, $C \triangleq \{c_1, c_2, \ldots, c_N\}$ denotes a fixed corpus of a set of N text segments, also referred to as contexts (though a dynamic corpus may be provided). As further described below, the corpus may be a user(s) specific corpus that includes text segments which have been created, accessed, edited, selected, and/or otherwise associated with one or more users, referred to herein as a targeted user. $D \triangleq \{t_1, t_2, \ldots, t_d\}$ denotes terms which appear in the corpus and for which a semantic relatedness is estimated, for example as described below. A term may be any frequent phrase (unigram, bigram, trigram, etc.) in the corpus, e.g., "book", "New York", The Holly Land." D may be provided as a dictionary. Optionally, according to the above definitions, the corpus is analyzed as described below, so as to construct automatically a function $f(t_1,t_2)$ that ranks the semantic relatedness of the terms $t_1,t_2 \in D$ according to semantic characteristics, optionally subjective. Optionally, $f$ provides a relative value inducing a complete order over the relatedness of all terms in D.

According to some embodiments of the present invention, as outlined above, the corpus is set to include a plurality of text segments pertaining to a targeted user. For example, the corpus includes webpages which are created, accessed, selected and/or uploaded by the targeted user. In another example, the corpus includes files which are associated with the targeted user, for example stored in one or more directories in his computer, stored in a storage location associated therewith and/or in a list of files he provides. In another example, the corpus includes text segments which are related to users which are socially connected to the targeted user.

According to some embodiments of the present invention, the corpus is set to include a plurality of text segments pertaining to a certain field of interest or topic, for example music, sport, law, and/or mathematics and/or any sub topic or sub field of interest. Optionally, the corpus includes textual network documents, such as webpages, which are retrieved in response to search queries which are optionally submitted by the targeted user. In another option, the corpus includes files associated with a certain publisher. In such embodiments, the method may be used for generating a semantic relatedness dataset that is suitable for a certain search or semantic activity pertaining to a defined field of interest or topic, sub field of interest or sub topic, and/or a search query. The method may be used for generating a semantic relatedness dataset used for a semantic search based on the received search query. The semantic search may be performed as known in the art, using the generated semantic relatedness dataset.

Optionally, as shown at 102, a weight is calculated for each one of the text segments, for example, by a weighting module 65. Optionally, the weight is assigned according to a relation between a targeted user and the text segment. Such weights may be selected to characterize intellectual interests and (general) knowledge of the targeted user. For example, the weights may be given based on manual inputs of a user which ranks the importance of each text segment thereto. Additionally or alternatively, a weight is calculated automatically per text segment according to an analysis of the text thereof, for example semantically. Additionally or alternatively, a weight is calculated automatically according to the behavior of the targeted user with reference to the text segment. For example, the corpus includes webpages which are accessed by the targeted user. In such embodiments, the rank may be given according to the frequency the targeted user visits the webpage, the frequency the targeted user visits a respective website, whether the respective website is marked as a favorite webpage by the targeted user, the time the targeted user spends in the webpage and/or the like. In another example, the corpus includes files which are associated with the targeted user, for example on one or more directories in his computer, in a storage location associated therewith and/or in a list of files he provides. The documents may also document created by the targeted user, for example emails, word processor documents, converted recordings of the user, and/or the like.

In such embodiments, the rank may be given according to the frequency the targeted user opens the document, the number of people the targeted user shared the document with, the storage location of the document, the whether the targeted user is the author of the document, the time the targeted user spends editing the document and/or the like. In another example, the corpus includes text segments which are related to users which are socially connected to the targeted user. In such embodiments, the rank may be given according to the relation of the socially connected users to the text segment, for example whether they are the authors of the text segment or not, shared the text segment in a social network or not, send the text segment for friends or not, accessed the text segment, for example using a browser, received the text segment in response to a search query, and/or the like.

Optionally, the weight is given according to weighted semantics $WS(t_1, \ldots, t_n)$ of terms $t_1, \ldots, t_n$, for example as follows:

$$WS(t_1, \ldots, t_n) \triangleq |\Sigma_{c \in S(t_1, \ldots, t_n)} w(c)|$$

where $w(c) \in R^+$ denotes a weight assigned to text segment c and the following normalization constraint $$\Sigma_{c \in C} w(c) = |C| = N.$$

is imposed.

In such embodiments, given a corpus, $C = \{c_1, c_2, \ldots, c_N\}$, W, which is a set of weights is calculated and for brevity defined as follows:

$$W \triangleq \{w(c_1), w(c_2), \ldots, w(c_N)\},$$

As shown at 103, the prevalence of a co-appearance of each of the plurality of pairs of terms $(t_x, t_y)$ in the plurality of text segments is estimated, for example by the dataset generation module 62. The co-appearance may be calculated by mapping the presence of terms in each text segment, see, for example, R. L. Cilibrasi and P. M. B. Vitanyi, "The Google Similarity Distance," in, IEEE Transactions on Knowledge and Data Engineering, 19:370-383, 2007, which is incorporated herein by reference.

Now, as shown at 104, a semantic relatedness of terms of each pair are evaluated according to the respective prevalence of co-appearance of the terms and optionally the weights which are given to the text segments wherein the co-appearance of the pair is detected, for example by the dataset generation module 62.

Optionally, the semantic relatedness between $t_1$ and $t_2$ estimated by a function that determines the relatedness/distance between terms $t_1$ and $t_2$. The function may be a weighted semantic function $f(C, W, t_1, t_2)$. For example, the function may be a function wherein most co-occurrence measures are applied. Another example is a Weight-extended Pointwise Mutual information function, for instance:

$$Z = \sum_{t_1, t_2 \in D} WS(t_1, t_2), \; P(t) = P(t,t), \; P(t_1, t_2) = \frac{WS(t_1, t_2)}{Z}$$

In another example, the function calculates a weighted normalized semantic distance (WNSD) between $t_1$ and $t_2$ as follows:

$$WNSD_W(t_1, t_2) \triangleq \frac{\max\{\log(WS(t_1)), \log(WS(t_2))\} - \log(WS(t_1, t_2))}{\log(Z) - \min\{\log(WS(t_1)), \log(WS(t_2))\}},$$

where W denotes a set of weights and Z denotes a normalization constant which may be calculated as follows:

$$Z \triangleq \Sigma |WS(t_1, t_2)|.$$

$t_1, t_2 \in D$

The WNSD quantifies the semantic relatedness of two terms regardless of the types of relations which link these terms. In such embodiments, WNSD is calculated for each pair of term in D. This allows, as shown at 105, to generate and output a semantic relatedness dataset, optionally user(s) specific, which maps the semantic relatedness between each pair of terms in D for a targeted user or for a group of users. This semantic relatedness dataset may be used for semantic search, analysis, and/or indexing of textual information, optionally in a personalized or group specific manner. This semantic relatedness dataset may be used for data mining, speech analysis and/or any diagnosis that uses semantic relations.

Optionally, the semantic relatedness dataset is used for promoting a product and/or a service for advertising to the targeted user and/or group of users. For example, AdWords for the targeted user and/or group may be selected according to the semantic relatedness dataset. Additionally or alternatively, the semantic relatedness dataset is used for selecting content for the targeted user and/or group. For example, the semantic relatedness dataset may be used as a semantic map for a search engine which serves the targeted user and/or group, a content aggregator which automatically aggregates content for the targeted user and/or group and/or any other module which uses semantic relations for identifying targeted content for the targeted user and/or group.

Figure 3:
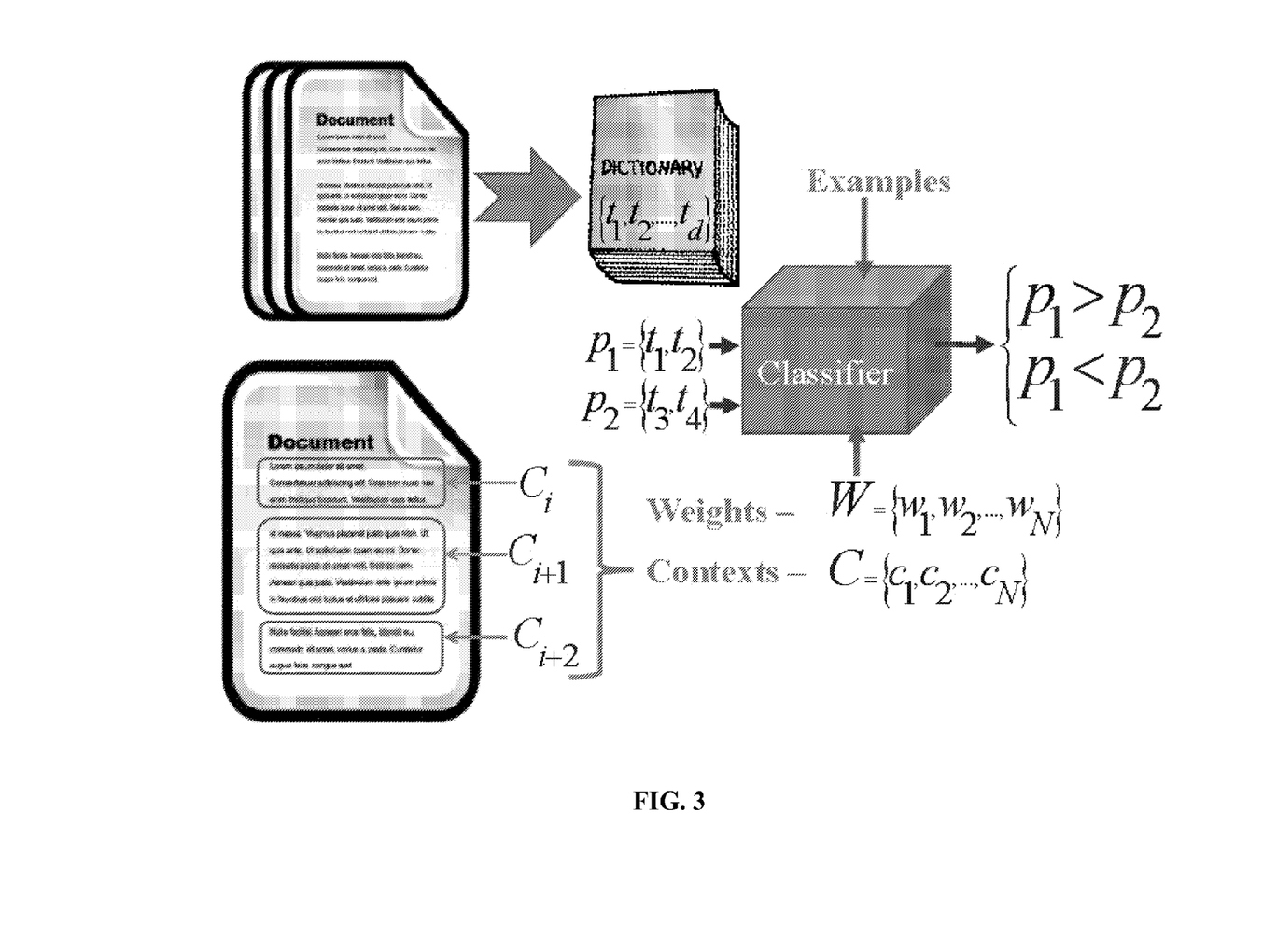
FIG. 3 is a schematic illustration wherein a classifier receives text segments weights and uses a weighted function therewith to rank the semantic relatedness between two (or more) pairs of terms denoted herein as $P_1$ and $P_2$, according to some embodiments of the present invention.

According to some embodiments of the present invention, the function that determines the relatedness/distance between terms, for example the WNSD, is used for classifying pairs of terms, for example by ranking the semantic relatedness thereof. For example, as shown in FIG. 3, a classifier which executes the function receives the aforementioned text segments and weights and uses the function therewith to rank the semantic relatedness between two (or more) pairs of terms denoted herein as $P_1$ and $P_2$.

According to some embodiments of the present invention, WNSDs which are calculated for pairs in D are used for minimizing and/or maximizing a training error and/or reward over a training set $S_m$ having weights, for example the corpus, by fitting the weights according to a function $f_W(t_1, t_2)$ which monotonically increases or decreases weight(s) of text segment(s) comprising $(t_1, t_2)$.

The minimizing and/or maximizing are optionally performed according to an empirical risk minimization (ERM). A specific (and effective) method for achieving ERM in the present context is the following (but many other methods may work). First, the dataset $S_m$, a learning rate factor, denoted herein as a, a learning rate factor threshold, denoted herein as $\alpha_{max}$, and a learning rate function, denoted herein as $\lambda$ are provided. Now pairs are evaluated. For example, if $e=(X=(\{t_1,t_2\},\{t_3,t_4\}), y=+1)$ and $WNSD_W(t_1,t_2)<WNSD_W(t_3,t_4)$, the semantic relatedness score of $t_1$ and $t_2$ is increased and the semantic relatedness score of $t_3$ and $t_4$ is decreased. The semantic relatedness scores are adjusted by multiplicatively promoting and/or demoting the weights of the contexts in which $t_1,t_2$ and $t_3,t_4$ co-occur.

The weight increase and/or decrease depend on $\lambda_{up}$ and/or $\lambda_{dn}$ which are defined as follows:

$$\lambda_{up} \triangleq \frac{\alpha \cdot \lambda(\Delta_e) + 1}{\alpha \cdot \lambda(\Delta_e)}$$

$$\lambda_{dn} \triangleq \frac{\alpha \cdot \lambda(\Delta_e)}{\alpha \cdot \lambda(\Delta_e) + 1}.$$

In such embodiments, the weight(s) are updated in accordance with an error and/or a reward size. $\lambda$ is used to update text segment weights in accordance with the size of incurred mistake(s) for example $e=(X=(\{t_1 t_2\},\{t_3,t_4\}),y)$ is defined as:

$$\Delta_e \triangleq |WNSD_W(t_1,t_2) - WNSD_W(t_3,t_4)|.$$

In such embodiments, $\lambda$ decreases monotonically so that the greater $\Delta_e$ is, the more aggressive $\lambda_{up}$ and $\lambda_{dn}$ are. The learning speed of the above process depends on these rates, and overly aggressive rates might prevent convergence due to oscillating semantic relatedness scores.

The above process gradually refines the active learning rates as follows:

$$\Delta \triangleq \Sigma \Delta_e,$$

e is not satisfied where $\Delta$ denotes a total sum of differences over unsatisfied pairs. If $\Delta$ decreases in each iteration, the process converges and the active learning rates remain the same. Otherwise, the process updates the active learning rate to be less aggressive by doubling $\alpha$. Note that a decrease of $\Delta$ may be used to control convergence. The process iterates over the pairs until its hypothesis satisfies all of them, or a exceeds the $\alpha_{max}$ threshold. Optionally, the above process is performed as follows:

```
1:   Initialize:
2:     w⃗ ← 1⃗
3:     Δ_prev ← MaxDoubleValue
4:   repeat
5:     Δ ← 0
6:     for all e = ((( {t_1, t_2}, {t_3, t_4} ), y) ∈ S_m do
7:       if (y == −1) then
8:         ({t_1, t_2}, {t_3, t_4}) ← ({t_3, t_4}, {t_1, t_2})
9:       end if
10:      score_12 ← WNSD_w⃗ (t_1, t_2)
11:      score_34 ← WNSD_w⃗ (t_3, t_4)
12:      if (score_12 < score_34) then
13:        {This is an unsatisfied example.}
14:         λ_up ← (α·λ(Δ_e) + 1) / (α·λ(Δ_e))
15:         λ_dn ← (α·λ(Δ_e)) / (α·λ(Δ_e) + 1)
16:        Δ ← Δ + Δ_e
17:        for all c ∈ S(t_1, t_2) do
18:          w(c) ← w(c) · λ_up
19:        end for
20:        for all c ∈ S(t_3, t_4) do
21:          w(c) ← w(c) · λ_dn
22:        end for
23:        Normalize weights s.t.  Σ_{c∈C} w(c) = |C|
24:      end if
25:    end for
26:    if (Δ ≥ Δ_prev) then
27:      α ← 2 · α
28:      if (α ≥ α_max) then
29:        return
30:      end if
31:    end if
32:    Δ_prev ← Δ
33:  until Δ == 0
```

Optionally, the process allows generating a set of normalized weights, for example as a vector W.

As described above, the semantic relatedness dataset is adapted according to inputs or information pertaining to one or more users for example personalized or adjusted to a certain field of interest. According to some embodiments of the present invention, the personalized semantic relatedness dataset is analyzed to identify one or more characteristics of the targeted user or group of users according to which the weights have been generated.

According to some embodiments of the present invention, a user manually weights each one of the pairs. In such embodiments, the user is presented with a plurality of pairs of terms, then the user inputs a plurality of semantic relatedness evaluations each indicative of semantic relatedness between members of another of the pairs. For example a user is presented, during each of a plurality if iterations, with two pairs and give a relative semantic relatedness evaluation accordingly, for example by indicating which pair has a higher semantic relatedness. Now, weights are calculated for the pairs. Each weight is calculated according to a respective group of the semantic relatedness evaluations, for example according to the user inputs in iterations which included the weighted pair. Now, a prevalence of a co-appearance of each of pairs of terms in a plurality of text segments is calculated, for example as described above. This allows evaluating a new semantic relatedness between members of each pair according to a combination of a respective prevalence and a respective weight. The evaluation is used to generate a semantic relatedness dataset, such as a model, similarity to the described above. It is expected that during the life of a patent maturing from this application many relevant systems and methods will be developed and the scope of the term a computing unit, an interface, and a database is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions, illustrate some embodiments of the invention in a non limiting fashion.

Reference is now made to an empirical study wherein results are indicative and suggest that a semantic relation dataset generated according to above method, for example referred to herein as model W, contains useful information that can be interpreted and perhaps even be utilized in number of different applications, for example as suggested above.

Given a specific topic T in a comprehensive textual knowledge repository, for example sports in Wikipedia, a set of documents pertaining to T, denoted herein as $S_T$, is extracted. For example, the repository is Wikipedia and the extraction is performed using topic tags. $S_T$ is partitioned, optionally uniformly, at random into two subsets, $S_T^1$ and $S_T^2$. The subset $S_T^1$ was used for labeling, and the subset $S_T^2$ was used as part of the BK corpus together with the rest of the Wikipedia corpus. A synthetic rater annotated preferences based on NSD applied over $S_T^1$, whose articles were partitioned to paragraph units. The resulting semantic preferences are denoted as T-semantics. Taking $D_{1000}$ as a dictionary, a training set is generated by sampling uniformly at random m=2,000,000 preferences, which are tagged using the T-semantics. Then the above method is applied to learn the T-semantics using this training set while utilizing $S_T^2$ (as well as the rest of Wikipedia) as a BK corpus, whose documents were parsed to the paragraph level as well. Then the resulting $W_T$ model examined.

Figure 4A:
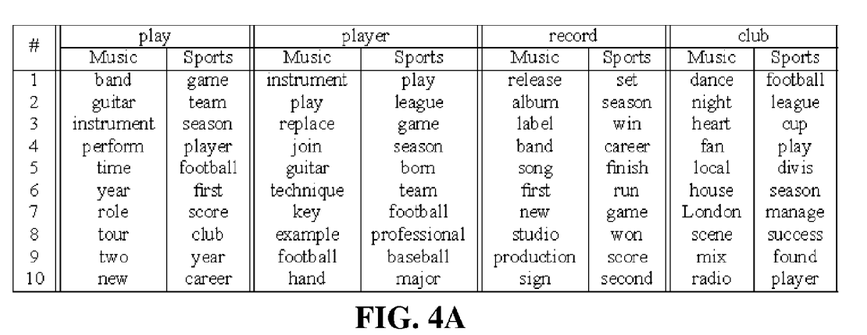
FIG. 4A depicts a Table that exhibits exemplary terms which are related to each other according an analysis that is performed according to some embodiments of the present invention.
Figure 4B:
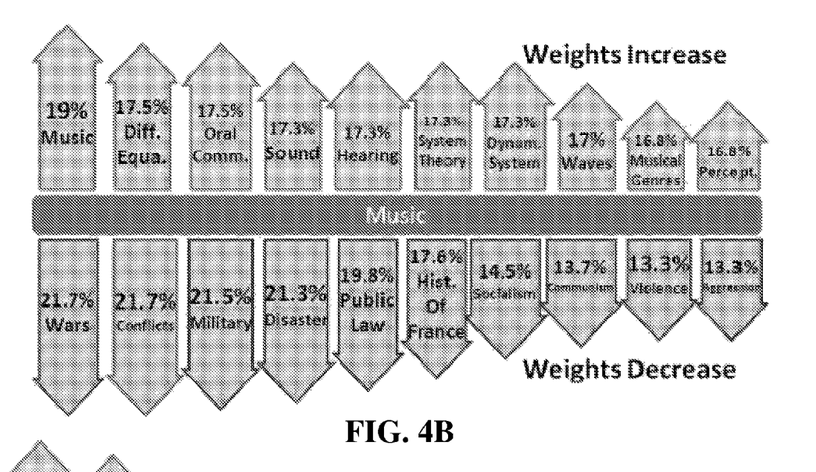
FIGS. 4B and 4C are graphs depicting increase and/or decrease of weights of text segments which are given according to some embodiments of the present invention.
Figure 4C:
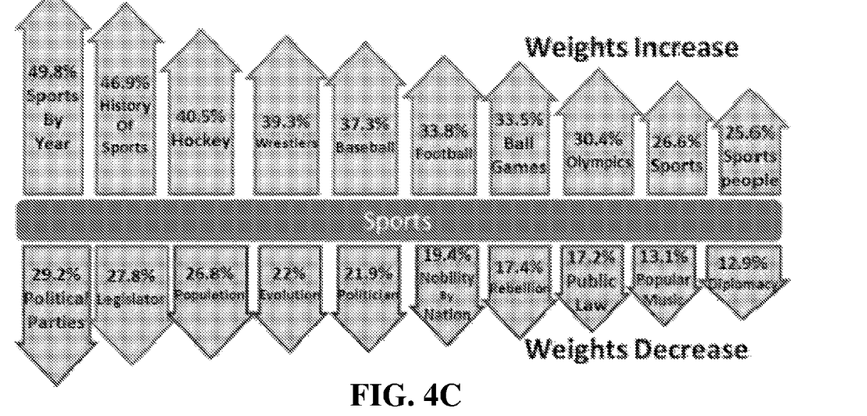

For this example, two exemplary topics (denoted as T) are considered: Music and Sports, resulting in two models: $W_{music}$ and $W_{sports}$. In order to observe and understand the differences between these two models, a few target terms that have ambiguous meanings with respect to Music and Sports have been identified and selected. The target terms are: play, player, record, and club. FIG. 4A depicts a Table 1 exhibits top 10 most related terms to each of the target terms according to either $W_{music}$ or $W_{sports}$. It is evident that the semantics portrayed by these lists are quite different and nicely represent their topics. The table in FIG. 4A emphasizes the inherent subjectivity in SR analyses, that should be accounted for when generating semantic models. Given a topical category C in Wikipedia and a hypothesis h an aggregate C-weight is defined, according to h, as a sum of the weights of all contexts that belong to an article categorized into C or Wikipedia sub-categories. Also, given a topic T, its initial hypothesis, is denoted by $h_{init}^T$ and its final hypothesis (after learning), is denoted by $h_{final}^T$. In order to evaluate the influence of the labeling semantics on $h_{final}^T$ for each topic T, the difference between its aggregate C-weights is calculated according to $h_{init}^T$ and according to $h_{final}^T$. FIGS. 4B and 4C present increase and/or decrease in those aggregate C-weights for Wikipedia's major categories C. In both cases of labeling topics, i.e. Music or Sports, it is easy to see that the aggregate weights of categories which are related to the labeling topic were increased, while weights of unrelated categories were decreased. It should be noted that when considering the Music topic, many mathematical categories dramatically increase their weight.

To summarize, it is clear that above method may be used for identifying the intellectual affiliation of the synthesized labeler. This indicates that the weights may be organized in a meaningful and interpretable manner, which encodes the labeling semantics as a particular weight distribution over the corpus topics. In addition, not only that above method may be used for identifying the labeler BK, it unexpectedly also revealed related topics. Moreover, the above exemplifies the effect the content of the text segments in the corpus have on the semantic relations.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method of evaluating semantic relatedness of terms, comprising:
    obtaining a plurality of text segments extracted from a plurality of documents associated with at least one user;
    calculating, using a processor, a plurality of weights, each one of said plurality of weights is calculated for a text segment of said plurality of text segments based on an analysis of the behavior of said at least one user with reference to said each text segment;
    calculating a prevalence of a co-appearance of each of a plurality of pairs of terms in said plurality of text segments;
    evaluating a semantic relatedness for determining the strength of the semantic relatedness between the terms of each said pair according to a combination of: 1) a prevalence of the said pair in said plurality of text segments, and 2) the weight of each text segment of said plurality of text segments in which a co-appearance of said pair occurs; and
    generating a semantic relatedness dataset mapping said semantic relatedness between at least some terms of said plurality of pairs of terms, said dataset is subject to said at least one user.

2. The method of claim 1, further comprising using said semantic relatedness for minimizing an error in said plurality of weights.

3. The method of claim 1, further comprising using said semantic relatedness for maximizing a reward in said plurality of weights.

4. The method of claim 1, wherein each said text segment is a member of a group consisting of a sentence, a paragraph, a set of paragraphs, an email, an article, a webpage, an instant messaging (IM) content, a post in a social network, a tweet, a website, and a file containing text.

5. The method of claim 1, wherein said plurality of text segments are associated with at least one field of interest.

6. The method of claim 1, wherein said plurality of text segments are extracted from a plurality of webpages visited by said at least one user.

7. The method of claim 1, wherein said plurality of text segments are authored by said at least one user.

8. The method of claim 1, wherein said calculating a plurality of weights comprises monitoring a plurality of network documents associated with said at least one user and calculating said plurality of weights accordingly.

9. The method of claim 1, wherein said plurality of text segments are extracted from a plurality of documents stored in storage allocated to said at least one user.

10. The method of claim 1, wherein said evaluating comprises determining at least one characteristic of said at least one user according to an analysis of said semantic relatedness dataset.

11. The method of claim 10, wherein said plurality of text segments comprises a member of a group consisting of: an email sent by said at least one user, an email sent to said at least one user, a webpage viewed by said at least one user, a document retrieved in response to a search query submitted by said at least one user, a file stored on a client terminal associated with said at least one user, and a file stored in a storage location associated with said at least one user.

12. The method of claim 11, wherein said storage location is a member of a group consisting of: a client terminal, a virtual storage location, an email server, a web server, and a search engine record.

13. The method of claim 1, further comprising classifying at least some terms of each said pair according to said semantic relatedness.

14. The method of claim 1, wherein said calculating a plurality of weights comprises calculating said plurality of weights according to input provided by said at least one user for at least some of said plurality of text segments.

15. The method of claim 1, wherein said calculating a plurality of weights for each text segment comprises calculating said plurality of weights according to a match with a search history of said at least one user.

16. The method of claim 1, wherein said calculating a plurality of weights comprises calculating each of said plurality of weights according to an origin of a respective said text segment.

17. The method of claim 1, wherein said calculating a plurality of weights is calculated according to an active learning algorithm which analyzes each text segment of said plurality of text segments.

18. The method of claim 1, wherein said calculated prevalence of each of said plurality of pairs of terms in said plurality of text segments is used to generate a training set for a classifier.

19. The computerized method of claim 1, wherein said behavior is selected from the group consisting of the frequency of visits to an electronic document including said text segment, whether said at least one user has marked an electronic including said text segment as a favorite, the time said at least one user spends viewing an electronic document, and combinations thereof.

20. The computerized method of claim 19, wherein said electronic document is a member of a group consisting of: a web page, a web site, an email, and a word processor document.

21. The computerized method of claim 19, wherein each said behavior is ranked, and said weighting analysis accounts for the rank of each said behavior.

22. A computerized method of evaluating a semantic relatedness of terms, comprising:
    identifying a plurality of text segments extracted from a plurality of documents associated with at least one targeted user;
    calculating, using a processor, a plurality of weights, each e of said plurality of weights is calculated for a text segment of said plurality of text segments based on an analysis of the behavior of said at least one targeted user with reference to each one of said plurality of text segments;
    calculating a prevalence of a co-appearance of each of a plurality of pairs of a plurality of terms in said plurality of text segments;
    evaluating a semantic relatedness between said terms of each said pair according to said prevalence, and the weights of said text segments in which a co-appearance of each of said pairs occurs, generating a semantic relatedness dataset mapping said semantic relatedness between at least some of said plurality of terms, wherein said semantic relatedness dataset is subjective to said at least one targeted user; and using said semantic relatedness dataset in conjunction with inputs of said at least one user for at least one of aggregating personalized content, searching for content, and providing services to said at least one targeted user.

23. A system of evaluating a semantic relatedness of terms, comprising:

a processor;

an input interface which receives a plurality of text segments extracted from a plurality of documents associated with at least one user;

a weighting module calculating a plurality of weights, each one of said plurality of weights is calculated for a text segment of said plurality of text segments based on an analysis of the behavior of said at least one user with reference to said each text segment; and a dataset generation module which, using said processor, A) calculates a prevalence of a co-appearance of each of a plurality of pairs of terms in said plurality of text segments, B) evaluates a semantic relatedness between the terms of each said pair according to a combination of: 1) a prevalence of the said pair in said plurality of text segments, and 2) a weight of each text segment of said plurality of text segments in which a co-appearance of said pair occurs, said semantic relatedness subjective to said at least one user and, C) generates a semantic relatedness dataset mapping said semantic relatedness between said terms of each said pair.

24. A computerized method of evaluating semantic relatedness of terms, comprising:

presenting a user with a plurality of pairs of terms;

receiving from said user, a plurality of semantic relatedness evaluations each indicative of semantic relatedness between members of a pair of terms of said plurality of pairs of terms;

calculating, using a processor, a plurality of weights, each one of said plurality of weights is calculated for each pair of said plurality of pairs according to a respective group of said plurality of semantic relatedness evaluations as received from said user;

calculating a prevalence of a co-appearance of each pair of terms of said plurality of pairs of terms in a plurality of text segments extracted from of documents; and evaluating a new semantic relatedness between the terms of each said pair according to a combination of said prevalence of each said pair of said plurality of pairs, and said weight for each said pair of said plurality of pairs;

generating a semantic relatedness dataset mapping said semantic relatedness between at least some terms of said plurality of pairs of terms; and, wherein said semantic relatedness is subjective to said user;

wherein said calculating, using a processor, a plurality of weights is performed based on an analysis of the behavior of said user with reference to each one of said plurality of text segments.

25. The computerized method of claim 24, wherein said presenting comprises presenting said user with two of said plurality of pairs of terms in each of a plurality of iterations and receiving from said user, in each said iteration, one of said plurality of semantic relatedness evaluation.

* * * * *